United States Patent [19]
Morino et al.

[11] Patent Number: 5,140,362
[45] Date of Patent: Aug. 18, 1992

[54] SHUTTER FOR SINGLE LENS REFLEX CAMERA

[75] Inventors: Yukio Morino; Kazuo Akimoto, both of Yotsukaido, Japan

[73] Assignee: Seikosha Co., Ltd., Japan

[21] Appl. No.: 232,435

[22] Filed: Aug. 15, 1988

[30] Foreign Application Priority Data

Aug. 13, 1987 [JP] Japan .................. 62-202162

[51] Int. Cl.$^5$ ........................... G03B 7/08
[52] U.S. Cl. .................... 354/435; 354/439
[58] Field of Search ........... 354/435, 436, 437, 439, 354/440

[56] References Cited

U.S. PATENT DOCUMENTS

| | | | |
|---|---|---|---|
| 3,945,025 | 3/1976 | Stempeck | 354/437 |
| 4,360,258 | 11/1982 | Hashimoto | 354/435 |
| 4,634,254 | 1/1987 | Ogihava et al. | 354/439 |
| 4,720,726 | 1/1988 | Sato et al. | 354/439 |
| 4,984,003 | 1/1991 | Matsumoto et al. | 354/440 |

FOREIGN PATENT DOCUMENTS 922604 11/1960 United Kingdom .

*Primary Examiner*—Russell E. Adams
*Attorney, Agent, or Firm*—Bruce L. Adams; Van C. Wilks

[57] ABSTRACT

A shutter for a single lens reflex camera performs exposure operation by means of a drive motor after closing once an opening responding to release operation from a state that the shutter opening is opened.

Said shutter provides a drive member actuated by the drive motor, an operating member which opens and closes the shutter opening by actuating a shutter blade actuated by said drive member, holding means for holding said operating member at an opened position of the shutter opening and means for closing said shutter blade rapidly at the initial stage of actuation of said drive motor.

12 Claims, 4 Drawing Sheets

SHUTTER FOR SINGLE LENS REFLEX CAMERA

BACKGROUND OF THE INVENTION

The present invention relates to a shutter for a single lens reflex camera and more particularly to a shutter which performs an exposure operation by actuating a shutter blade by means of a drive motor.

A shutter in which the opening and closing actuation of a shutter blade is performed by a drive motor is composed so that the motor is rotated forwardly by a release operation thereby to open the shutter blade gradually, and the motor is rotated reversely when the opening quantity reaches a value corresponding to the brightness of the object so as to close the shutter blade.

When such a shutter is applied to a single lens reflex camera, the shutter blade must be kept opened for determining the composition of the object and then closed once when the photographing action is commenced. However, the closing movement of the shutter blade follows actuation of to the motor, and in a motor which rotates slowly, a time lag is produced until the exposure operation is completed, and a discrepancy results between the exposure value intended by a photographer and that of the photographed scene.

In order to solve such a problem, it is required to increase the motor speed, but there are such problems that consumption of the camera battery is large because the consumption current of the motor is increased, the motor size becomes larger and so forth, which are not suitable for a portable camera.

SUMMARY OF THE INVENTION

It is an object of the present invention which has been made in view of such problems to provide a shutter capable of closing a shutter blade rapidly and executing an exposure operation instantly when the photographing action is commenced.

In order to achieve such an object, the present invention is composed so that an operating member which operates the opening and closing actions of the shutter blade is held by holding means at a shutter opening opened position, and the holding means is released with the commencement of the photographing action so that the operating member closes the shutter blade rapidly by close-out means.

BRIEF DESCRIPTION OF THE DRAWINGS

The drawing figures show embodiments according to the present invention.

DETAILED DESCRIPTION OF PREFERRED EMBODIMENTS

Figure 1:
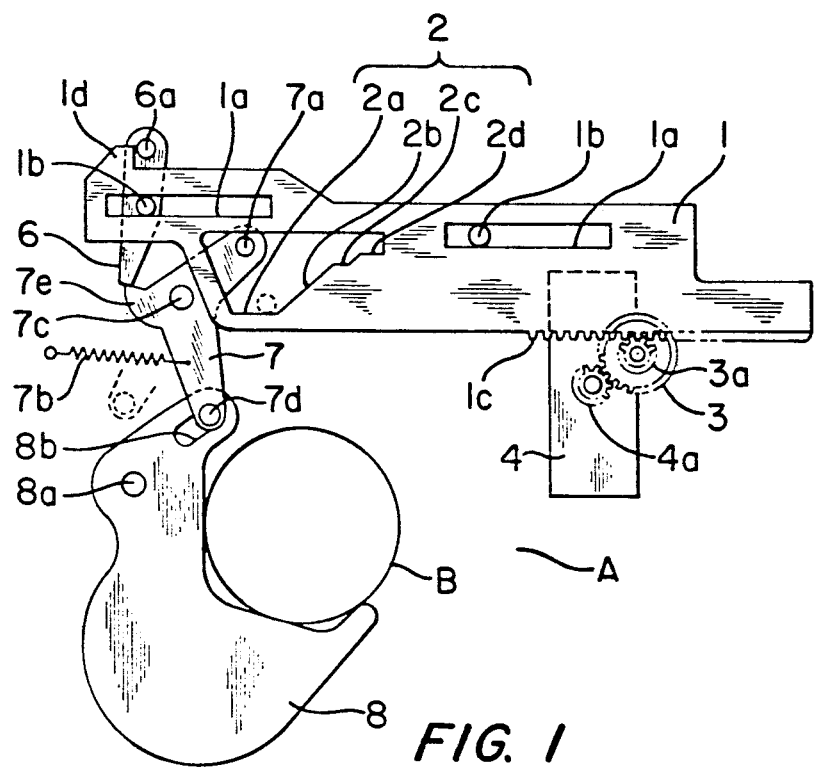
FIG. 1 shows a camera which is in readiness for photographing.

Now, details of the present invention will be described hereunder with reference to the embodiments shown in the drawings.

FIG. 1 shows an embodiment according to the present invention. A drive member 1 is fitted to pins 1b, 1b on a fixed substrate A so that it may travel through long grooves 1a, 1a. On the drive member 1 are formed a rack portion 1c which gears with a pinion 3a that receives a driving force from a drive motor 4 and a projection 1d which is engaged with a pin 6a of a locking member 6 which locks an operating member 7 for holding a shutter blade 8 at a fully opened position. At the commencement of an exposure operation of the drive member 1, a cam surface portion 2 consisting of a portion 2a which is parallel to the travelling direction for rendering the shutter blade 8 inoperative, an inclined portion 2b for rotating the shutter blade 8, and step portions 2c and 2d engages, and a pin or cam 7a, provided at one arm end of the operating member 7, the operating member 7 being biased clockwise by means of a spring 7b so that the pin 7a abuts against the cam portion 2.

The operating member 7 is supported rotatably on the fixed substrate A with a shaft 7c, and a pin 7d provided at another arm end is engaged with a groove 8b of the shutter blade 8 and a claw portion 7e is locked with the locking member 6.

The locking member 6 is supported rotatably with the pin 1b and biased in the counterclockwise direction by a spring not shown.

The drive motor 4 is a motor provided with a pinion 4a, and the forward and reverse rotations thereof are controlled by a well-known electronic circuit.

The pinion 4a gears with a pinion 3, and the pinion 3a which is integrated with and rotates together with the pinion 3 gears with the rack 1c and is reduced in speed gradually.

The shutter blade 8 is pivoted on the fixed substrate A by a shaft 8a and opens and closes a shutter opening B formed on the fixed substrate A by means of a groove 8b in which slides a pin 7d. Though, only one piece of shutter blade 8 is shown for the purpose of simplifying the drawing, it is understood that a plurality of shutter blade pieces may be used.

Figure 2:
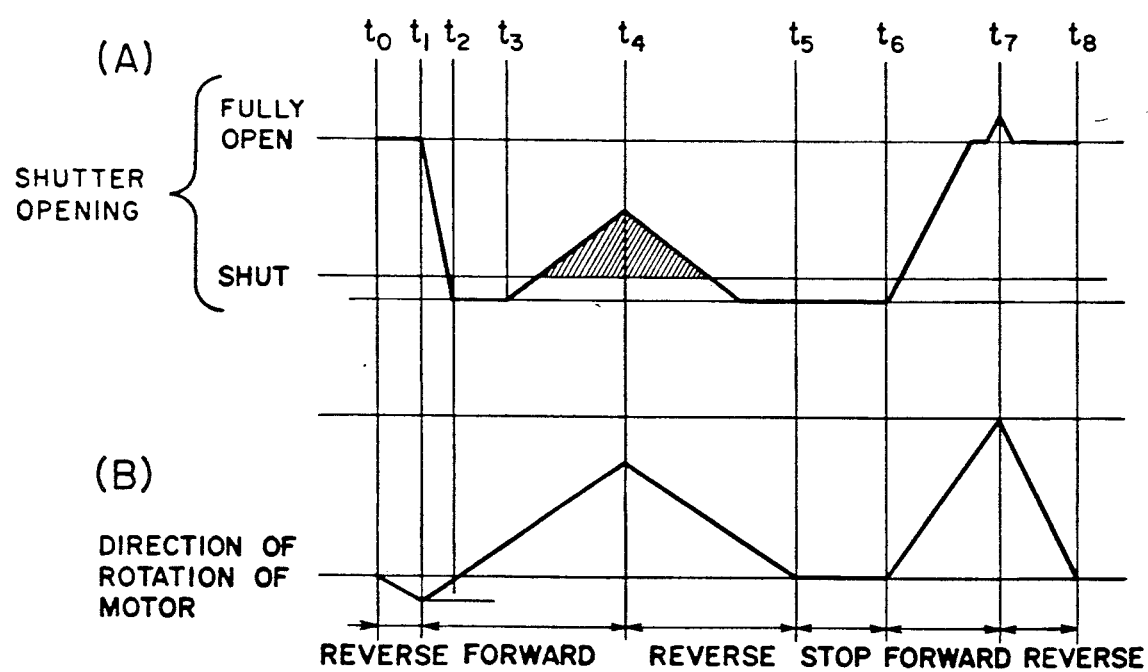
FIG. 2 is a chart showing the actuation timing of the shutter shown in FIG. 1, which shows the lapse of time in the rightward direction.

FIG. 2 shows diagrams showing the direction of rotation of the drive motor 4 and the opened or closed state of the shutter opening B by means of the shutter blade 8 in relation to the elapsed time.

The actuating method of the shutter will now be described referring to FIG. 2.

When a power supply is connected to an electronic circuit (not shown) for initiating a photographing operation by a release button of the camera after focus adjustment of a camera lens is performed through the shutter opening B under the charged state shown in FIG. 1, the drive motor 4 rotates reversely counterclockwise and rotates the pinion gears 4a and 3 to drive the rack 1c, thereby to move the drive member 1 rightward.

The drive member 1 moves rightward, presses the pin 6a with the projection 1d, and causes the locking member 6 to rotate clockwise around the pin 1b thereby to release the engagement between the locking member 6 and the claw portion 7e.

When locking of the claw portion 7e is released, the operating member 7 rotates clockwise around the shaft 7c by means of the spring 7b, and actuates the shutter blade 8 by means of the pin 7d and groove 8b until the pin or cam 7a abuts against the parallel portion 2a of the cam portion 1, thereby to rotate the shutter blade 8 counterclockwise around the shaft 8a, thus rapidly closing the opening B with the shutter blade 8.

It is needless to say that the mirror (not shown) of the monocular reflex camera has moved to the photographing state position at the same time, but a douser (not shown) which is provided so that a light beam passing through the opening B does not reach to the film surface also moves to the photographing state position. Since these structures are usually provided in a camera of this type, they are not shown in the drawing.

At the time $t_1$ when the locking is released for the shutter blade 8 to close the opening B, the driving motor 4 changes from reverse rotation to forward rotation though the shutter blade 8 does not begin to open during the time $t_1$ to $t_2$. Means to control this timing for inverting the direction of motor rotation may be composed by a well-known method such as measurement of the elapsed time from the starting point or the number of rotation of the drive motor 4, or the action of a detector responding to displacement the drive member 1, the locking member 6, the operating member 7, the shutter blade 8 and so forth, which, however, is not described in details.

When the drive motor 4 rotates forwardly, the drive member 1 moves leftward, the pin 7a moves along the parallel portion 2a of the cam portion 2 from the time $t_2$ (which is exaggerated in FIG. 2 (b), but is instantly after $t_1$) when the operating member 7 closes the shutter blade 8 completely, and then, the operating member 7 is rotated counterclockwise around the shaft 7c against the biasing action of the spring 7b beginning at the time $t_3$ when the pin 7a is pushed up by the inclined portion 2b. Thus, the shutter blade 8 starts to open the opening portion B gradually by means of the pin 7d.

On the other hand, at the time $t_1$ when the drive motor 4 starts the forward rotation, a well-known exposure control electronic circuit (not shown) is started, and the elapsed time to response to the brightness of the object is measured, and the drive motor 4 is rotated reversely again at the time $t_4$ when proper exposure is obtained. Thus, the drive member 1 moves rightward again, and at the same time, the pin 7a follows the cam portion 2 so that the operating member 7 is rotated clockwise by the spring 7b, and the shutter blade 8 rotates counterclockwise thereby to close the opening B, thus completing the exposure operation.

The driving motor 4 stops at the time $t_5$ when the shutter blade 8 completes closing completely and operation is stopped, and then, when the mirror and douser (not shown) are reset to return to the initial state, the drive motor 4 rotates forwardly at the time $t_6$, the drive member 1 and the operating member 7 are actuated in the similar manner as abovementioned activation, and the shutter blade 8 opens the opening portion B again.

As shown in FIG. 2 (A), when the drive motor 4 is further rotated forwardly so that the shutter blade 8 exceeds the fully opened position of the opening portion B, the pin 7a starts reverse rotation at the time $t_7$ when the operating member 7 is rotated counterclockwise along step portions 2c and 2d of the cam portion 2. That is, the claw portion 7e takes a state capable of locking again by means of the locking member 6 when the pin 7a abuts against the step portion 2d, and the locking member 6 is rotated counterclockwise by means of a spring (not shown). Thus, by the rightward movement of the drive member 1, both members are engaged.

At the time $t_8$ when the drive motor 4 rotates reversely and the respective members have returned to the initial state, the operation in one cycle is completed and the drive motor 4 is stopped.

The step portions 2c and 2d of the cam portion 2 are provided in the abovementioned description in order to simplify the explanation. In actuality, these step portions may be formed on an extension of the inclined portion 2b.

Figure 3:
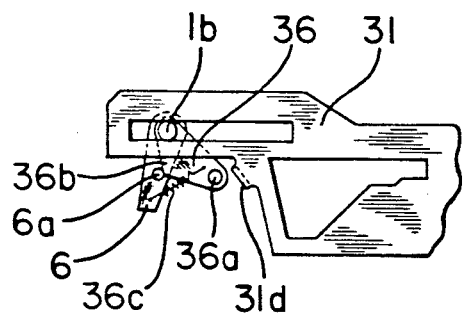
FIG. 3 shows another embodiment of a part of FIG. 1.

Further, the relation between the projection 1d and the pin 6a is composed so as to act by the reverse rotation of the drive motor 4 at the initial stage, however, as shown in the modification of FIG. 3, it may also be arranged in such a way that the whole operation is started such that the drive motor 4 rotates forwardly without rotating reversely from the initial stage so as to move the drive member 1 leftward. That is, by the forward rotation of the drive motor 4, a downward projection 31d of the drive member 1 pushes a pin 36a so as to rotate a locking lever 36 clockwise around the pin 1b, and thus, a shoulder portion 36b of the locking lever 36 pushes the pin 6a, which enables release of the engagement between the locking member 6 and the claw portion 7e. When the downward projection 31d reaches the left end, the pin 36a rides over the projection 31d and is displaced to the right side of the projection 31d.

In FIG. 3, the locking member 6 is rotated counterclockwise by means of a spring (not shown) and a spring 36c is stretched between the locking lever 36 and the locking member 6.

Figure 4:
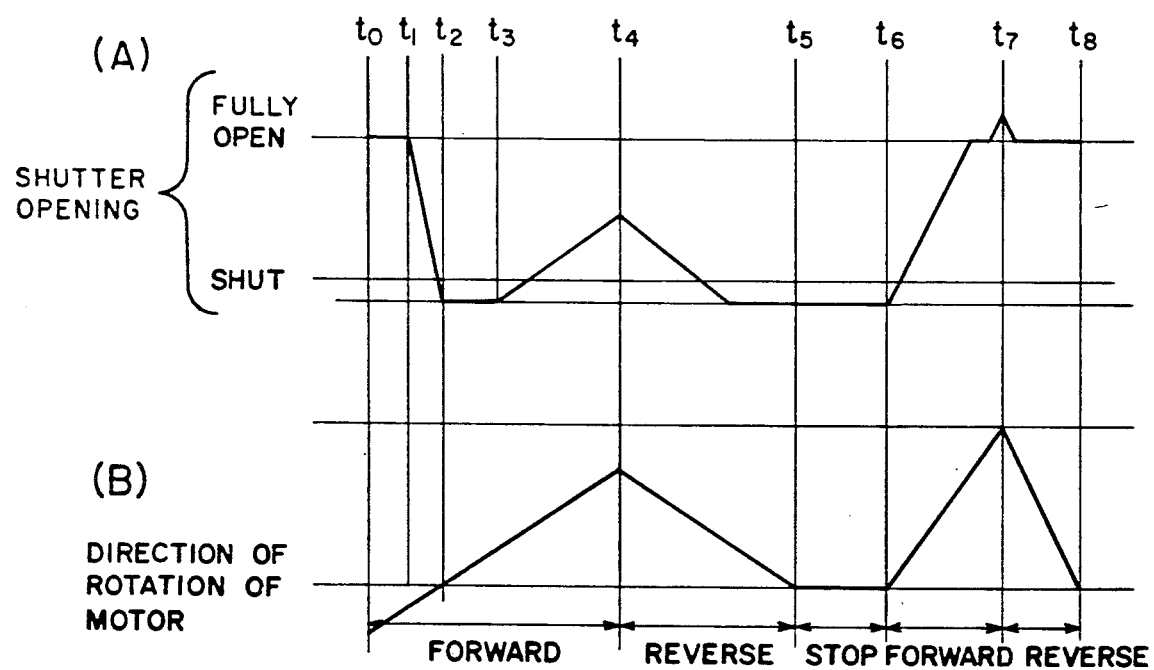
FIG. 4 shows the actuation timing thereof.

With such a composition as described above, the actuation is started by the leftward movement of the drive member 1, actuation at respective times $t_0$, $t_1$ ... $t_7$ shown in FIG. 4 (B) is performed, the locking member 6 locks the claw portion 7e, then the drive motor 4 rotates reversely so that the downward projection 31d rotates the pin 36a counterclockwise around the pin 1b during the process untill the time $t_8$, and rotates the locking lever 36 counterclockwise against the spring 36b, but the locking member 6 does not rotate counterclockwise. When the drive member moves rightward, the pin 36a is released from the downward projection 31d, and the locking lever 36 returns to the state shown in FIG. 3 by means of the spring 36b, thus completing the operation in one cycle.

Figure 5:
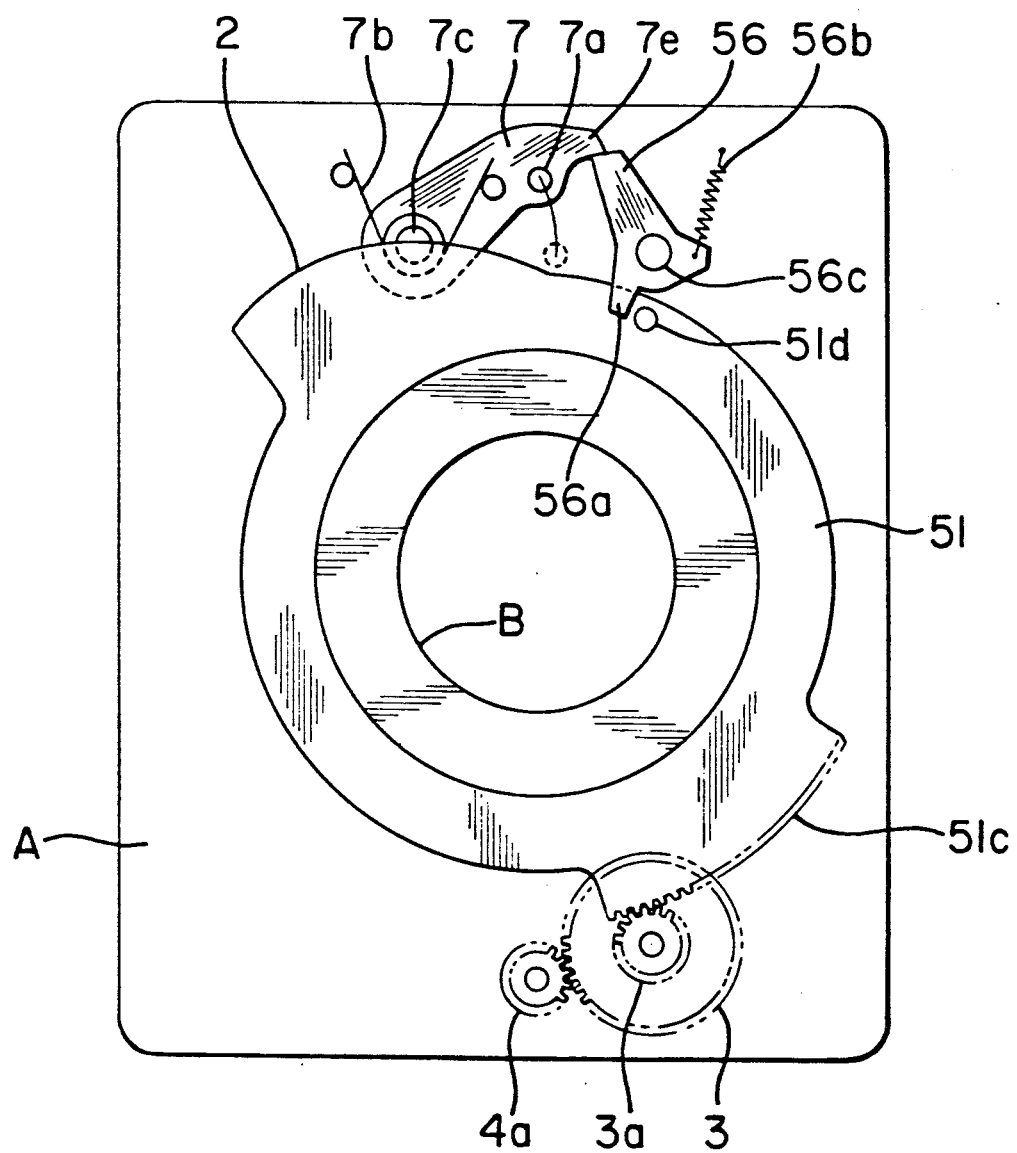
FIG. 5 shows a third embodiment, which is shown corresponding to FIG. 1.

FIG. 5 shows an embodiment in which the drive member 1 shown in FIG. 1 is disposed so as to rotate or angularly displace around the shutter opening B. Those parts that have the same operational effects as in FIG. 1 are marked with the same symbols, and those parts that are modified to some extent are shown with symbols added with 50, respectively.

The method of operation of the FIG. 5 embodiment will now be described. When the action corresponding to camera operation is taken similarly to the case shown in FIG. 1, and the drive motor 4 rotates reversely, a toothed wheel 51c is actuated by means of pinions 4a, 3 and 3a and a drive member 51 rotates counterclockwise around the opening B, a protrusion 51d pushes a protrusion 56a so as to rotate a locking member 56 clockwise around a shaft 56c against a spring 56b, thus releasing the engagement between the claw portion 7e and the locking member 56.

The operating member 7 rotates clockwise rapidly by means of the spring 7b, thereby to actuate the shutter blade 8 to close the opening B.

It is a matter of course that the abovementioned mirror and douser (not shown) are actuated in the same manner, and when the drive motor 4 rotates forwardly in succession, the drive member 51 rotates clockwise so that the pin 7a is pushed by the cam portion 2, the operating member 7 rotates counterclockwise around the shaft 7c, which actuates the shutter blade 8 to open the shutter opening B gradually. Similarly to the case shown in FIG. 1, the drive motor 4 is rotated reversely again by a well-known electronic circuit (not shown) at the time $t_4$ when proper exposure is obtained. Since the pin 7a rotates clockwise following the cam portion 2 by means of the spring 7b, the operating member actuates the shutter blade 8 to close the opening B, thus completing the exposure operation.

When the mirror and the douser are reset at the elapsed time $t_5$ similarly to the case shown in FIG. 1, the drive motor 4 rotates forwardly (time $t_6$), and the drive member 51 is rotated clockwise so that the shutter blade 8 opens the opening B through the operating member 7.

When the drive motor 4 rotates further forwardly and the operating member 7 rotates further counterclockwise, the claw portion 7e is locked by the locking member 56. At the elapsed time $t_7$, the drive motor 4 rotates reversely and the operation in one cycle is completed at the time $t_8$ when the respective members have returned to the charged state shown in FIG. 5, and the drive motor 4 is stopped.

Figure 6:
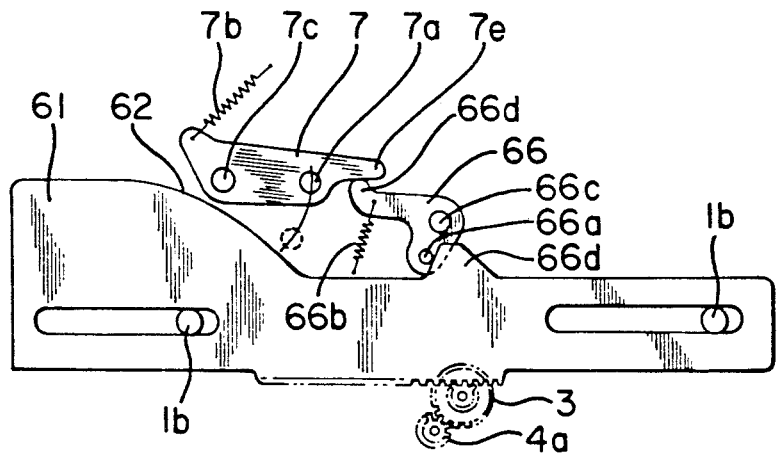
FIG. 6 shows a fourth embodiment and FIG. 7 shows a fifth embodiment, both being shown corresponding to FIG. 1.

FIG. 6 shows an embodiment in which the drive motor 4 starts forward rotation from the initial stage in a similar manner as the case shown in FIG. 3. It is an explanatory view of the principal parts in which those parts that have the same operational effects as those shown in FIG. 1 are marked with the same symbols, and those parts that are modified to some extent are shown with symbols added with 60, respectively.

The operation method of the FIG. 6 embodiment will now be described. When the action responding to camera operation is performed similarly to the case shown in FIG. 3, the drive motor 4 rotates forwardly, and the drive member 61 moves rightward, a pin 66a follows a projection 61d and a locking member 66 rotates counterclockwise around a shaft 66c by means of a spring 66b, and rotates a point portion 66d located at a sufficiently remote position from a shaft 66c as compared with the pin 66a at an enlarged speed thereby to displace the point portion 66d from the acting area of the claw portion 7e.

Accordingly, the operating member 7 rotates clockwise rapidly around the shaft 7c by the spring 7b and actuates the shutter blade 8, thereby to close the opening B. Actuation is performed similarly to the case shown in FIG. 3 hereafter, and thus explanation thereof is omitted in order to avoid duplication.

Figure 7:
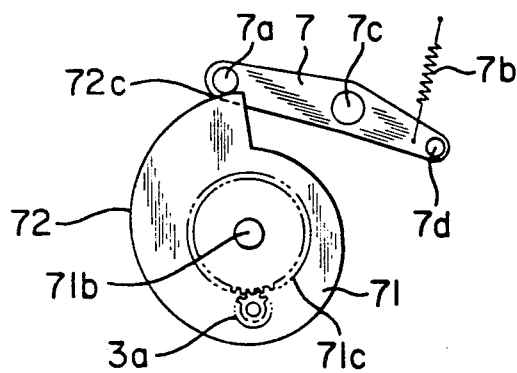
Figure 8:
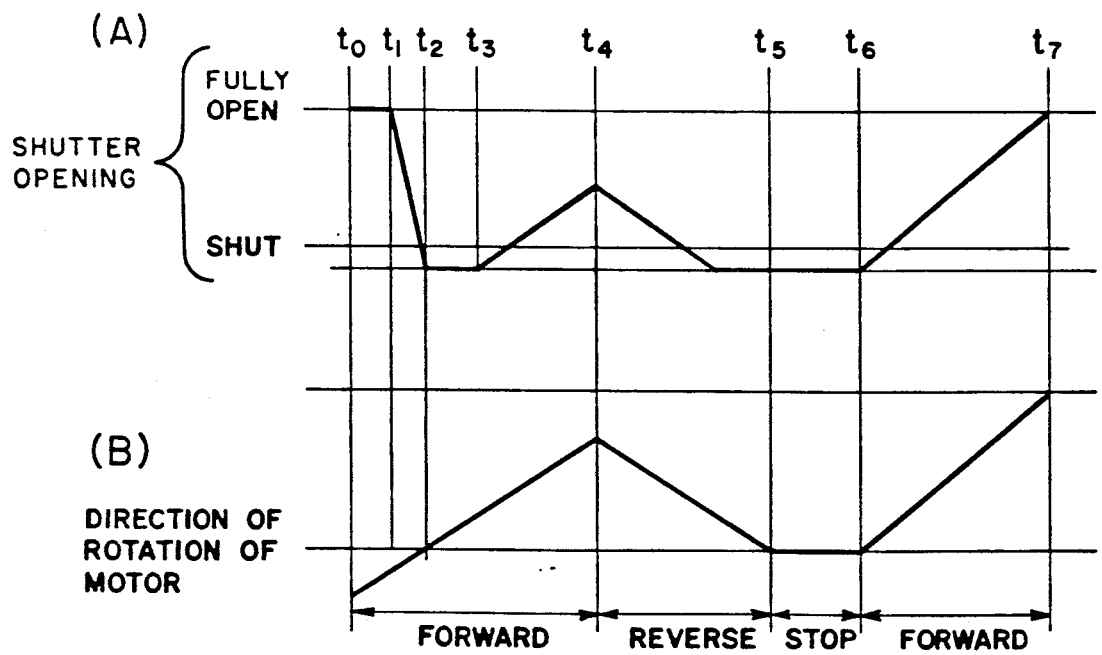
FIG. 8 shows the actuation timing of FIG. 7.

FIG. 7 shows another embodiment in which the drive motor 4 starts forward rotation from the initial stage similarly to the case shown in FIG. 3. It is an explanatory view of the principal parts in which those parts that have the same operational effects as those shown in FIG. 1 are marked with the same symbols, and those parts that are modified to some extent are shown with symbols added with 70, respectively. FIG. 8 shows diagrams showing the opened and closed state vs. elapsed time.

The method of operation of the FIG. 7 embodiment will now described. When the action responding to camera operation is performed similarly to the case shown in FIG. 3, and the drive motor 4 rotates forwardly and a drive member 71 rotates counterclockwise around a shaft 71b, the pin 7a is released from a step portion 72c of a cam portion 72, the operating member 7 rotates counterclockwise around the shaft 7c by means of the spring 7b, and the shutter blade 8 is actuated by means of the pin 7d thereby to close the opening B.

Hereafter, the actuation is performed similarly to the case shown in FIG. 3. The drive motor 4 rotates reversely effect completion of the exposure, the drive member 71 rotates clockwise and the mirror and the douser are reset in a similar manner as the case described previously at the time $t_5$ of completion, the drive motor 4 rotates forwardly at the time $t_6$, and rotates the drive member 71 counterclockwise thereby to push the pin 7a by a cam portion 72, and the operating member 7 is rotated clockwise so that the shutter blade 8 opens the opening B.

In case of the FIG. 7 embodiment, the operation in one cycle is completed at this time $t_7$, and the pin 7a is pushed by a step portion 72c and stopped.

The shaft 71b may be in accord with the shutter opening B in FIG. 7, but it is possible to obtain a preferable camera configuration by providing the shaft at a point on the peripheral portion of the opening B.

Also, the drive member 7 may be rotated by well-known electromagnetic forces in place of the action of the spring 7b.

As is apparent from the explanation described above, it is possible to close the shutter blade rapidly at the initial stage of the actuation of the drive motor. Therefore, the exposure operation of the shutter is commenced at a comparatively early time after start of the exposure operation. In case of applying the shutter with a drive motor as the motive power to a single lens reflex camera, it is also possible to confine the upredictable delay of the shutter to a minimum.

That is, in case of a single lens reflex camera, delay of the shutter actuation is produced as compared with a camera in general because displacement operation of the mirror is required. In addition, there are problems as described at the beginning of the specification for a shutter with a drive motor as the motive power, and problems are produced in practical use due to this additional delay time. According to the present invention, a shutter with a drive motor which solves such problems as the motive force may be applied to a single lens reflex camera very effectively.

Besides, it is possible to apply the present invention with modification for adapting to various uses.

What is claimed is:

1. A camera shutter comprising: a set of shutter blades movable in opening and closing directions to open and close a shutter opening; means including a reversible drive motor operative when actuated for effecting sequential movement of the set of shutter blades from a closed position in which the shutter opening is closed to an open position in which the shutter opening is open and back to the closed position to define an exposure operation and then back to the open position to place the set of shutter blades in a charged state in readiness for the next exposure operation; and means for rapidly moving the set of shutter blades from the open position in the charged state to the closed position immediately prior to the start of the next exposure operation.

2. A camera shutter according to claim 1; wherein the means for rapidly moving the set of shutter blades comprises releasable holding means for releasably holding the set of shutter blades in the open position in the charged state, means operative upon release of the holding means for rapidly moving the set of shutter blades to the closed position, and means for releasing the holding means immediately prior to the start of the next exposure operation.

3. A camera shutter according to claim 2; wherein the means for releasing the holding means comprises means for releasing the holding means in response to initial actuation of the reversible drive motor but before the drive motor effects movement of the set of shutter blades in the opening direction to initiate an exposure operation.

4. A camera shutter according to claim 1; wherein the means for effecting sequential movement of the set of shutter blades includes a displaceable member displaceable in forward and reverse directions in response to forward and reverse rotations of the reversible drive motor, and means driven by the displaceable member for effecting opening movement of the set of shutter blades in response to forward rotation of the reversible drive motor and closing movement of the set of shutter blades in response to reverse rotation of the reversible drive motor.

5. A camera shutter according to claim 4; wherein the displaceable member comprises a linearly displaceable member mounted to undergo linear displacement in forward and reverse directions.

6. A camera shutter according to claim 4; wherein the displaceable member comprises an angularly displaceable member mounted to undergo angular displacement in forward and reverse directions.

7. A camera shutter according to claim 4; wherein the displaceable member has a cam surface, and the means driven by the displaceable member includes a movable cam slidable along the cam surface in response to displacement of the displaceable member in the forward and reverse directions to effect opening and closing movements of the shutter blades.

8. A camera shutter according to claim 7; wherein the means for rapidly moving the set of shutter blades includes a portion of the cam surface which is ineffective to cause the cam to effect opening or closing movement of the set of shutter blades, and means for moving the cam into sliding contact with said cam surface portion accompanied by rapid movement of the set of shutter blades to the closed position in response to displacement of the displaceable member in the reverse direction upon initial actuation of the reversible drive motor in the reverse direction before commencement of an exposure operation.

9. A camera shutter according to claim 1; wherein the means for rapidly moving the set of shutter blades comprises means responsive to initial actuation of the reversible drive motor, but before the drive motor effects movement of the set of shutter blades in the opening direction to initiate an exposure operation, for rapidly moving the set of shutter blades to the closed position.

10. A camera shutter according to claim 9; wherein the means for rapidly moving the set of shutter blades to the closed position comprises a spring-biased lever system.

11. A camera shutter according to claim 1; wherein the means for rapidly moving the set of shutter blades to the closed position comprises a spring-biased lever system.

12. A camera shutter according to claim 1; wherein the camera shutter comprises a camera shutter for a single lens reflex camera.

* * * * *